Patented June 2, 1942

2,284,797

UNITED STATES PATENT OFFICE 2,284,797

FURNACE CONSTRUCTION AND METHOD OF REPAIR

Henry H. Blau and Kenneth K. Knaell, Charleroi, Pa., assignors, by mesne assignments, to The Carborundum Company, Niagara Falls, N. Y., a corporation of Delaware Application June 8, 1936, Serial No. 84,029

6 Claims. (Cl. 49—54)

This invention relates to tanks for melting glass, and more particularly is concerned with tank construction and repair and with methods of effecting repair.

It is desirable to operate glass-melting tanks over long periods continuously without necessitating shut-down for repair. However, tanks have been attacked by the corrosive action of the molten glass, and in melting some kinds of glass thin spots have been worn in the bottoms of tanks due to this corrosive action aided by the convectional and hydraulic flow of the glass. This is particularly the case near the throat of a tank where the flow of glass is relatively rapid. After a certain period these worn portions of the tank become so thin that it is necessary to shut down the tank and rebuild it.

It is the general object of our invention to avoid and overcome the foregoing and other difficulties attending the shut-down and repair or rebuilding of glass-melting tanks.

Another object of our invention is the provision of an improved construction for tanks or chambers of refractory material adapted for heating or treating glass and the like.

In the practice of our invention the worn portions of a tank wall are repaired while the tank is still hot, and while it contains molten glass, by preheating pieces of cast refractory of relatively small size and depositing them in the worn portions of the tank to thereby provide a covering layer of relatively heavy conglomerate cast refractory. The tank construction is further improved by making the throat well or other portions of the tank of blocks of cast refractory which serve as dams to aid in holding the small pieces of cast refractory in position. The expression "cast refractory" used here and throughout the specification and claims is a high refractory formed by fusing and casting suitable materials, such as mixtures of sand and alumina to form mullite. However, the preferred cast refractory contains not less than about 80 per cent alumina, the remainder being chiefly silica. Another suitable material is beta alumina formed by fusing alumina and about five per cent of sodium oxide.

Figure 1:
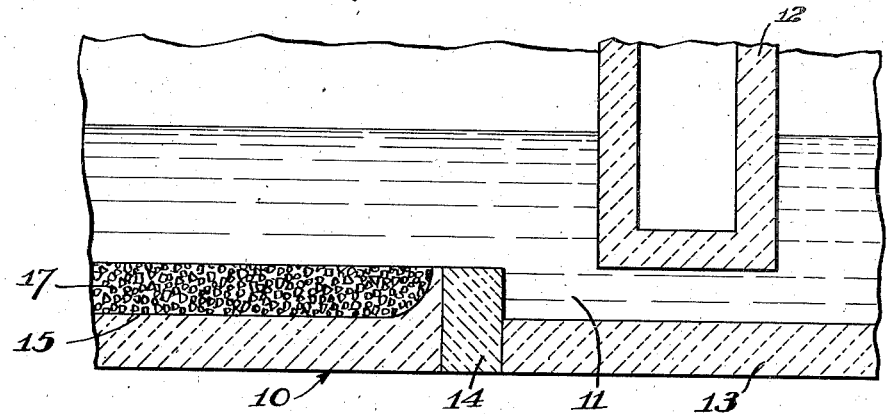
Figure 2:
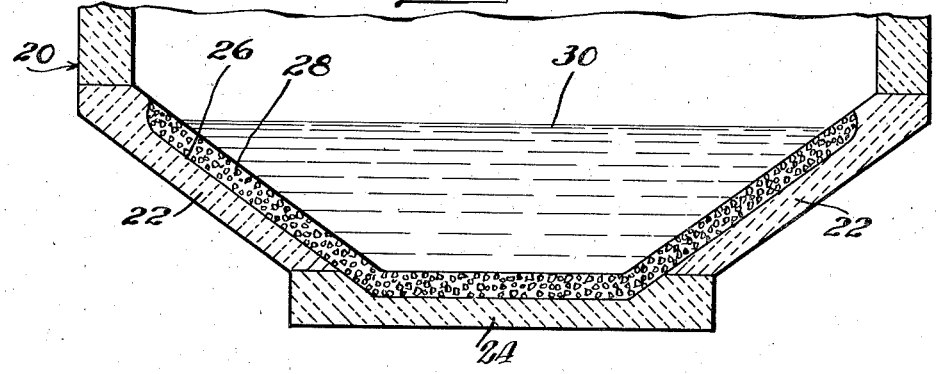
Figure 3:
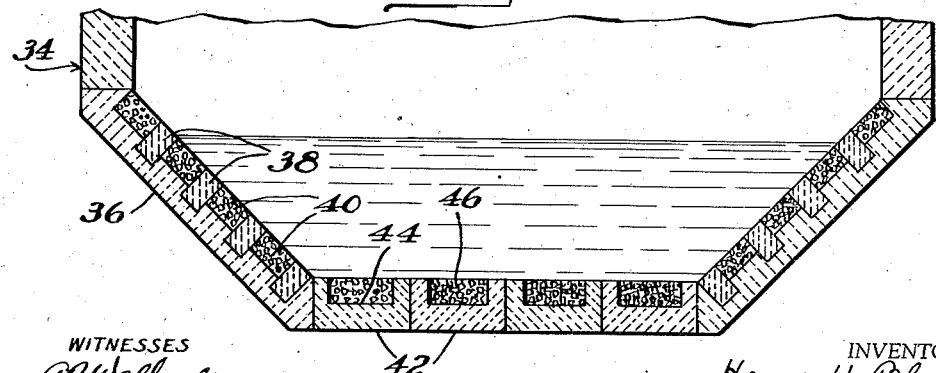

In the drawing Fig. 1 is a longitudinal vertical cross-sectional view through a portion of a typical continuous tank structure illustrating the invention; Fig. 2 is a cross-sectional view through a tank illustrating a modification of the invention; and Fig. 3 is a view similar to Fig. 2 but of another embodiment of the invention.

In the drawing the numeral 10 indicates generally a bottom of a tank made of ordinary bonded refractory which is not adapted to effectively withstand the corrosive action and flow of some kinds of glass over long periods. Formed in the bottom of the tank is a throat well 11, an associated bridge wall 12 and a throat dam 14. The bridge wall 12 and the bottom 13 of the throat are preferably made of cast refractory blocks adapted to highly resist the corrosive action of the glass. Although it is preferable to make these portions of the throat well of cast refractory, it is not requisite. However, the invention definitely contemplates making the throat well dam 14 of cast refractory to maintain the thickness of the tank bottom 10.

When the tank is first built the ordinary refractory bottom 10 may be made flush with the throat well dam 14, but during the continued operation of the tank the bottom wears away, for example, to the line 15. When the bottom of the tank becomes worn and thin the tank is repaired by filling in the thin portions thereof with relatively small pieces of dense cast refractory 17 in the manner illustrated in the drawing. This cast refractory is not harmful to the glass, has a higher specific gravity than molten glass, and the conglomerate pieces form a layer of protective material over the tank bottom 10 with the dam 14 functioning to hold them in position. We preferably form the cast refractory pieces of such size that a dense aggregate is provided with certain larger pieces being surrounded by smaller pieces in turn having the spaces therebetween filled with still smaller pieces as will be understood.

In making a hot repair in the tank the pieces 17 of cast refractory are preheated so as to avoid cooling of the glass in the tank and to avoid covering the pieces 17 with frozen glass, and they are then deposited on the corroded portions of the tank bottom in any suitable manner, as by throwing them into the furnace with a shovel or other feeding mechanism.

While the invention has been particularly illustrated and described as being employed for repairing a glass tank while hot, it should be understood that the invention can be utilized to originally construct a glass tank with protective layers of conglomerate cast refractory pieces. In this embodiment of the invention the tank bottom is made somewhat thinner than normally and a covering layer of conglomerate pieces of cast refractory of relatively small size and high specific gravity is placed over the bottom of ordinary bonded refractory, or in certain instances the bottom can be made of metal plate. To assist in holding the layer of cast refractory in position, dams of blocks of cast refractory are generally employed, not only at the throat well but in other portions of the tank as found necessary or desirable.

As heretofore described, hot repairs can be made to a tank with the molten glass still in the tank or the tank may be originally constructed with layers of protective cast refractory particles forming the glass-engaging surface of the tank.

In addition cold repairs may be made to the tank without rebuilding, and in this embodiment of the invention the molten glass is drained from the tank and the repairs are made while the tank is still hot or after it has cooled off by filling in the worn portions with relatively small pieces of cast refractory to form a conglomerate covering layer. The tank thus need not be rebuilt but can then be used to heat and refine molten glass in the usual manner.

The principles of our invention can also be applied to the repair of or the construction of other portions of a refractory tank or chamber. For example, as illustrated in Fig. 2, a tank, shown generally at 20, can be made with sloping side walls 22 and a bottom 24. The side walls and bottom are recessed in the construction of a new tank to form a pocket 26 receiving a layer 28 of aggregate formed of relatively small dense pieces of cast refractory. The slope of the walls 22 is such that the cast refractory pieces rest thereon within the angle of repose so that once placed an even layer of the cast refractory is provided in contact with the material 30, as for example molten glass, contained in the tank. Likewise we contemplate repairing a tank having sloping side walls by our improved means and methods. Ordinarily with a bonded refractory wall and a cast refractory aggregate of the character indicated the slope of the walls 22 should not exceed about 45 degrees with the horizontal in order to stay within the angle of repose.

In the embodiment of the invention shown in Fig. 3, the numeral 34 indicates generally a tank having side walls 36 inclined at a steeper angle than those of the tank shown in Fig. 2 and ordinarily beyond the angle of repose of material thereon. We accordingly provide horizontally extending ribs 38 preferably of cast refractory material on the tank walls which serve to retain layers 40 of refractory aggregate in position. The layers 40 comprise relatively small dense pieces of cast refractory of the composition heretofore described. It should be understood that we contemplate the use of ribs 38 on tank walls having surfaces within the angle of repose, as for example the form of tank shown in Fig. 2. Moreover, the ribs may be employed on the bottoms of tanks and chambers if desired.

The bottom of the tank 34 is made up of square or rectangular blocks 42 having recesses 44 formed in their upper faces, as seen in Fig. 3. The blocks are made of cast refractory of the composition above described and are characterized by high refractoriness and long life. The recesses 44 are filled with an aggregate 46 of relatively small pieces of dense cast refractory of a character and composition heretofore described. It should be appreciated that the recessed blocks 42 may be employed also for sloping side walls of a tank or chamber instead of ribs 38.

In the practice of the invention we may bond the aggregates of cast refractory pieces together, in any of the several examples shown, with particularly viscous, non-devitrifiable glass which glazes the various pieces and holds them securely together and in position. An example of such a bonding material is a glass consisting of $SiO_2$ 60%, $Al_2O_3$ 30% and $Na_2O$ 10%. In the event there is any devitrification of either the bonding material or the cast refractory pieces the products thereof should be heavier than glass and this is the case with the example given.

From the foregoing it will be apparent that the stated objects of the invention are achieved by the tank structures and methods of building and making repairs herein described. The methods facilitate tank repair without shut-down and prolong the life of a tank to thereby render the glass-manufacturing operation more economical.

The term wall as employed in the claims is intended to cover side walls, bottom walls, throat passages, etc., as will be understood.

While in accordance with the patent statutes one embodiment of the invention has been illustrated and several forms of the structure and method described, it should be appreciated that the invention is not limited thereto or thereby but is defined in the appended claims.

We claim:

1. The method of repairing the bottom of a glass-melting tank containing molten glass, comprising heating a loose mass of small lumps of cast refractory to substantially the temperature of the molten glass, the cast refractory being of higher specific gravity than the molten glass, and depositing the cast refractory through the molten glass to form a covering layer on the tank bottom.

2. In a tank or chamber containing molten glass the combination of a wall, a layer of loose aggregate formed of relatively small pieces of cast refractory supported by gravity on the wall and in contact with the glass in the tank, and cast refractory blocks carried by the wall and positioned to extend into the aggregate to hold it in position.

3. A refractory furnace containing molten glass which comprises a wall, a plurality of cast-refractory ribs extending out from the surface of the wall, and a loose aggregate of cast refractory pieces positioned between the ribs by gravity and contacting the molten glass.

4. A refractory furnace adapted to treat molten materials which comprises a plurality of cast refractory blocks having open recesses formed in their sides of greatest area adjacent the molten material and pieces of cast refractory of relatively small size received loose in the recesses and held therein by gravity and forming layers engaging the molten material over substantially the entire surface of the blocks so that the blocks are protected from corrosive contact with the molten material.

5. A refractory furnace adapted to treat molten materials which comprises a wall, a plurality of refractory ribs extending out from the surface of the wall, and a loose aggregate of refractory pieces positioned between the ribs by gravity and contacting the molten material so as to protect substantially the entire surface of the wall from the corrosive action of the molten material.

6. The method of repairing the bottom of a glass melting tank containing molten glass which comprises providing a loose aggregate of cast refractory particles having a higher specific gravity than the molten glass, and depositing the aggregate through the molten glass to form a covering layer on the tank bottom.

HENRY H. BLAU.
KENNETH K. KNAELL.